(12) United States Patent
Maneuf et al.

(10) Patent No.: US 11,357,606 B2
(45) Date of Patent: Jun. 14, 2022

(54) REINFORCING STRUCTURE FOR CORONAL-RADICULAR DENTAL RESTORATION, METHOD FOR CARRYING OUT CORONAL-RADICULAR DENTAL RESTORATION, AND CORONAL-RADICULAR RESTORATION

(71) Applicants: Bernard Maneuf, Voiron (FR); André Collombin, Voiron (FR); Bruno Clunet-Coste, Saint-Etienne de Crossey (FR)

(72) Inventors: Bernard Maneuf, Voiron (FR); André Collombin, Voiron (FR); Bruno Clunet-Coste, Saint-Etienne de Crossey (FR)

( * ) Notice: Subject to any disclaimer, the term of this patent is extended or adjusted under 35 U.S.C. 154(b) by 209 days.

(21) Appl. No.: 16/463,116

(22) PCT Filed: Nov. 22, 2017

(86) PCT No.: PCT/FR2017/053201
§ 371 (c)(1),
(2) Date: May 22, 2019

(87) PCT Pub. No.: WO2018/096260
PCT Pub. Date: May 31, 2018

(65) Prior Publication Data
US 2019/0282346 A1    Sep. 19, 2019

(30) Foreign Application Priority Data
Nov. 22, 2016  (FR) ........................................ 1661374

(51) Int. Cl.
*A61C 13/30*    (2006.01)
*A61C 5/35*    (2017.01)
(Continued)

(52) U.S. Cl.
CPC ................ *A61C 13/30* (2013.01); *A61C 5/35* (2017.02); *A61C 5/50* (2017.02); *A61C 1/082* (2013.01)

(58) Field of Classification Search
CPC .. A61C 13/30; A61C 5/35; A61C 5/50; A61C 1/082
(Continued)

(56) References Cited

U.S. PATENT DOCUMENTS 3,962,787 A * 6/1976 Corbett ................... A61C 13/30
433/220
4,936,776 A    6/1990 Kwiatkowski
(Continued)

FOREIGN PATENT DOCUMENTS

CH       562605 A5    6/1975
DE    3825601 A1    3/1989
(Continued)

OTHER PUBLICATIONS

Feb. 13, 2018 International Search Report issued in International Patent Application No. PCT/FR2017/053201.

*Primary Examiner* — Matthew M Nelson
(74) *Attorney, Agent, or Firm* — Oliff PLC

(57) ABSTRACT

A reinforcement structure for a crown and root tooth restoration includes: a plurality of reinforcement pins having diameters ranging from 0.1 mm to 0.5 mm, an etching canal facilitating access to an infected apex, in the crown and root restoration, a joining element configured to group the plurality of reinforcement pins together so as to form a bundle of pins, the joining element partially covering the length of the reinforcement pins.

7 Claims, 4 Drawing Sheets

(51) Int. Cl.
*A61C 5/50* (2017.01)
*A61C 1/08* (2006.01)

(58) Field of Classification Search
USPC .......................................................... 433/195
See application file for complete search history.

(56) References Cited

U.S. PATENT DOCUMENTS

| | | | | |
|---|---|---|---|---|
| 5,518,399 | A * | 5/1996 | Sicurelli, Jr. | A61C 13/30 433/220 |
| 5,741,139 | A * | 4/1998 | Sicurelli, Jr. | A61C 13/30 433/220 |
| 5,797,748 | A * | 8/1998 | Reynaud | A61C 13/30 433/220 |
| 6,132,215 | A * | 10/2000 | Prasad | A61K 6/831 433/220 |
| 6,183,253 | B1 | 2/2001 | Billet et al. | |
| 6,197,410 | B1 | 3/2001 | Vallittu et al. | |
| 6,267,597 | B1 * | 7/2001 | Kim | A61C 13/30 433/220 |
| 6,371,763 | B1 * | 4/2002 | Sicurelli, Jr. | A61C 13/30 433/220 |
| 7,318,726 | B2 * | 1/2008 | Nordin | A61C 13/30 433/224 |
| 7,488,175 | B2 * | 2/2009 | Karmaker | A61C 13/30 433/220 |
| 7,673,550 | B2 * | 3/2010 | Karmaker | B29C 70/222 87/1 |
| 8,062,035 | B2 * | 11/2011 | Le Guay | A61C 13/30 433/224 |
| 8,197,256 | B2 * | 6/2012 | Lu | A61C 13/30 433/220 |
| 8,227,018 | B2 * | 7/2012 | Mannschedel | B29C 48/154 427/2.26 |
| 9,839,493 | B2 * | 12/2017 | Maneuf | A61C 13/30 |
| 10,052,183 | B2 * | 8/2018 | Nordin | A61C 13/20 |
| 2002/0123023 | A1 * | 9/2002 | Sicurelli, Jr. | A61C 13/30 433/220 |
| 2003/0148247 | A1 * | 8/2003 | Sicurelli, Jr. | A61C 13/30 433/220 |
| 2006/0208393 | A1 * | 9/2006 | Karmaker | B29C 70/20 264/230 |
| 2009/0246738 | A1 * | 10/2009 | Karmaker | A61L 15/24 433/220 |
| 2011/0294095 | A1 * | 12/2011 | Jancar | A61C 13/1009 433/206 |
| 2015/0305829 | A1 * | 10/2015 | Maneuf | A61C 13/30 433/225 |
| 2019/0110864 | A1 * | 4/2019 | Clunet-Coste | A61C 13/30 |
| 2019/0282346 | A1 * | 9/2019 | Maneuf | A61C 5/35 |

FOREIGN PATENT DOCUMENTS

| | | |
|---|---|---|
| EP | 0809475 B1 | 1/2000 |
| EP | 1806110 A1 | 7/2007 |
| FR | 2588181 A1 | 4/1987 |
| FR | 2753365 A1 | 3/1998 |
| GB | 1255875 A | 12/1971 |
| JP | 2015-198885 A | 11/2015 |

* cited by examiner

REINFORCING STRUCTURE FOR CORONAL-RADICULAR DENTAL RESTORATION, METHOD FOR CARRYING OUT CORONAL-RADICULAR DENTAL RESTORATION, AND CORONAL-RADICULAR RESTORATION

BACKGROUND OF THE INVENTION

The invention relates to a reinforcement structure for a crown and root tooth restoration, to a method for performing a crown and root tooth restoration, to a crown and root tooth restoration, and to a method for etching one such crown and root tooth restoration.

STATE OF THE ART

In dentistry, and in particular in endodontics, when crown and root restorations are performed, and in particular to reconstruct the crown part of a tooth, the root part of the tooth is first of all shaped by drilling. Drilling is performed by means of rotary or cylindrical-conical ultrasonic instruments.

After shaping, a post is generally inserted and sealed in the root canal to act as retention for a crown restoration. To ensure a good strength, the post has to penetrate up to the apical third of the root.

The root canals are hermetically sealed with specific materials, such as cylindrical-conical cones made from gutta-percha, eugenol/zinc oxide pastes or resins in the form of bi-component preparations.

The crown part of the crown and root tooth restoration is then disposed around the root post. The crown part of the restoration is generally composed of composite resin.

This constitutes the traditional pattern of the "pivot tooth"—the tooth is constructed around the main root post which performs retention of the latter.

As described in Patent CH-A-562605, the posts can be made from a metallic material and are provided with a thread designed to screw the base of the post into the root canal. These posts are manufactured by turning and their cross-section is always circular with a conical or cylindrical-conical profile, with convex or concave angles.

Posts made from prefabricated composite material, possibly reinforced by fibres, are described in the documents FR 2588181, U.S. Pat. No. 4,936,776, DE-A-3825601, and EP-A-0432001. The posts present a straight cylindrical or cylindrical-conical finished shape and a rigid structure.

The canal is however often of irregular shape, for example of flattened, oval or figure-of-eight cross-section. It may be very tapered in its crown part and of oval cross-section. The canal may be curved and badly centred and the roots may be flat or concave.

To fit the post in the root canal, the practitioner therefore has to enlarge the canal and rectify its path. Fitting of the post may therefore be hazardous. Preparation of the housing of the post, by mechanical reaming, does in fact require circular preparations with displacement of the canal to the side of the curve, diminishment of the strength of the canal wall and a high risk of weakening and perforation.

Furthermore, as maximum contacts between the post and the canal walls are sought to be achieved, while at the same time attempting to limit dentin mutilation, the practitioner is therefore compelled to make the following choice:

either to use drill bits of large diameter with a high risk of perforation, or to use a drill bit of reasonable size; but in this case, the post will only have partial contacts with the areas that are non-instrumented or soiled by sealing material, resulting in poor adhesion and/or a poor transmission of stresses.

The document FR-A-2753365 describes an endo-canal post. The post is formed by a core coated with sheaths. The core made from composite material is semi-rigid and flexible, composed of an organic matrix reinforced by fibres. The sheaths are made from composite material pre-impregnated with resin and are in a pasty pre-polymerized state.

Before and during its insertion in the root canal, the insert, of cylindrical cross-section, is therefore flexible and malleable. The material is then polymerized as required by cross-linking means in order to change to a second polymerized state.

This type of reinforcement requires less drilling of the canal, thereby reducing the risks of weakening or perforation of the canal walls.

However, the pre-polymerized state of the resin impregnating the reinforcement and the extreme malleability of the post make insertion of the latter into a tooth canal and complete photo-polymerization at the level of the apex very hazardous.

The document GB 1255875 describes a pivot that is adaptable, case by case, to the morphology of the root of the tooth. The anatomic tooth canal retention has a non-circular cross-section. This shape enables the contact areas between the tooth post and root canal to be increased and makes for a better distribution of the mechanical forces.

The crown part of a crown and root tooth restoration can also be reinforced by laterally inserting auxiliary mini-posts (Fibercone® product of the RTD company) on the main post. These posts correspond to the traditional pattern of the pivot tooth. The accessory posts do not reinforce the whole of the crown part of a crown and root restoration.

In order to facilitate crown and root tooth restoration, it has been proposed to use groups of pins joined to one another by a joining part. The ends of the pins are free with respect to one another for ease of insertion of the pins into the tooth canal and so as to effectively strengthen the mechanical connection with the tooth canal that is filled with a composite resin. Different technical solutions are presented in the documents U.S. Pat. Nos. 6,197,410, 6,371, 763, 6,183,253, US 2011/0294095 or US 2015/0305829.

However it is sometimes necessary to access the apical areas of the tooth root again. The different materials forming the crown and root tooth restoration then have to be etched to form an access canal to the infected zone. As indicated in the numerous previous embodiments, the restoration is effected by means of a composite material comprising reinforcements formed by pins or posts. In so far as the composite resin was reinforced to enhance the mechanical connection, the etching operations are increasingly complicated with greater risks of perforation of the canal walls.

OBJECT OF THE INVENTION

The object of the invention is to remedy the shortcomings of the prior art and, in particular, to propose a structural reinforcement for a crown and root tooth restoration strengthening both the crown part and the root part in continuity while at the same time reducing the risks of weakening or perforation of the canal walls when subsequent access operations are performed.

This object tends to be achieved by means of a reinforcement structure for a crown and root tooth restoration comprising:
  a plurality of reinforcement pins,
  an additional pin made from a material that is etched more quickly than the plurality of reinforcement pins so as to form an etching canal,
  an joining means configured to group the plurality of reinforcement pins and the additional pin together so as to form a bundle of pins, said joining means partially covering the length of the reinforcement pins, the additional pin being fixed directly or indirectly to the joining means between the reinforcement pins.

In one development, the additional pin is surrounded by the plurality of reinforcement pins.

In a particular embodiment, the additional pin is fixed directly to at least one of the reinforcement pins of the plurality of reinforcement pins.

In advantageous manner, the additional pin is fixed directly to at least three reinforcement pins.

Preferentially, the additional pin is fixed to the adjacent reinforcement pin over at least 70% of its length.

In an advantageous embodiment, the additional pin covers at least one third of the circumference of the reinforcement pin in a section plane perpendicular to the longitudinal axis of the reinforcement pin.

It is advantageous to provide for the additional pin to cover at least two thirds of the circumference of the reinforcement pin in the section plane perpendicular to the reinforcement pin.

In an advantageous embodiment, the additional pin is made from polyisoprene.

In another development, the joining means is located at one of the ends of the bundle of pins.

Advantageously, the plurality of reinforcement pins comprises different reinforcement pins arranged so as to present an increasing diameter from the centre of the bundle to the periphery of the bundle.

Preferentially, the reinforcement pins have a decreasing diameter from the centre of the bundle to the periphery of the bundle.

In a particular embodiment, the bundle of pins comprises from 3 to 10 reinforcement pins.

It is advantageous to provide for the reinforcement pins of the plurality of reinforcement pins to have diameters ranging from 0.1 mm to 0.5 mm.

It is a further object of the invention to provide a method for performing a crown and root tooth restoration, on a laboratory model, that is simple to perform and that facilitates provision of an access to the apical part of the tooth canal once the restoration has been performed.

This objective tends to be achieved by means of a method comprising the following steps:
  at least partially filling a tooth canal of the laboratory model with a first composite resin,
  providing the reinforcement structure, according to any one of the appended claims,
  inserting the reinforcement structure in the tooth canal,
  polymerizing the first composite resin so as to obtain a crown and root tooth restoration.

In one development, the reinforcement structure is covered by a second composite resin and the polymerization step is configured to polymerize the first composite resin and the second composite resin.

In advantageous manner, before the polymerization step, a second reinforcement structure is placed alongside the first reinforcement structure, the second reinforcement structure not being provided with an additional pin forming an etching channel and the first reinforcement structure being located in the centre of the tooth canal.

It is a further object of the invention to provide a crown and root tooth restoration that facilitates subsequent access to the tooth canal in the laboratory model.

This object tends to be achieved by means of a crown and root tooth restoration obtained by one of the different embodiments above.

It is yet a further object of the invention to provide a method for accessing the inside of a crown and root tooth restoration that is easy to implement and reduces the risks of perforation of a canal wall.

This object tends to be achieved by means of a method for opening a crown and root tooth restoration comprising etching of the etching canal by means of a drill bit using the reinforcement pins of the reinforcement structure as guide for insertion of a drill bit.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

The inventors observed that when endeavouring to access an infected apex following a crown and root tooth restoration, the risks of weakening or perforation of the canal walls are linked to the difficulty of etching the restoration in a controlled direction over the whole depth of the restoration.

The inventors observed that it is difficult to master the etching direction on account of the hardness and strength of the reinforcement structures that are inserted in the crown and root tooth restoration. As indicated in the foregoing, the restoration is effected using a composite material that comprises at least one polymer resin associated with reinforcements in the form of pins.

The restoration is a composite element formed by materials having very different mechanical performances. These differences of mechanical behaviour are desirable to make the crown and root restoration easier to perform and to give the restoration a great strength. This is why it is particularly advantageous to place reinforcement pins in multiple directions and if possible in such a way as to be distributed over the whole volume of the reinforcement. However, these configurations greatly complicate the etching operations to access an infected apex. A modified reinforcement structure has therefore been proposed in order to secure the etching step of an access canal following the crown and root restoration.

Figure 1:
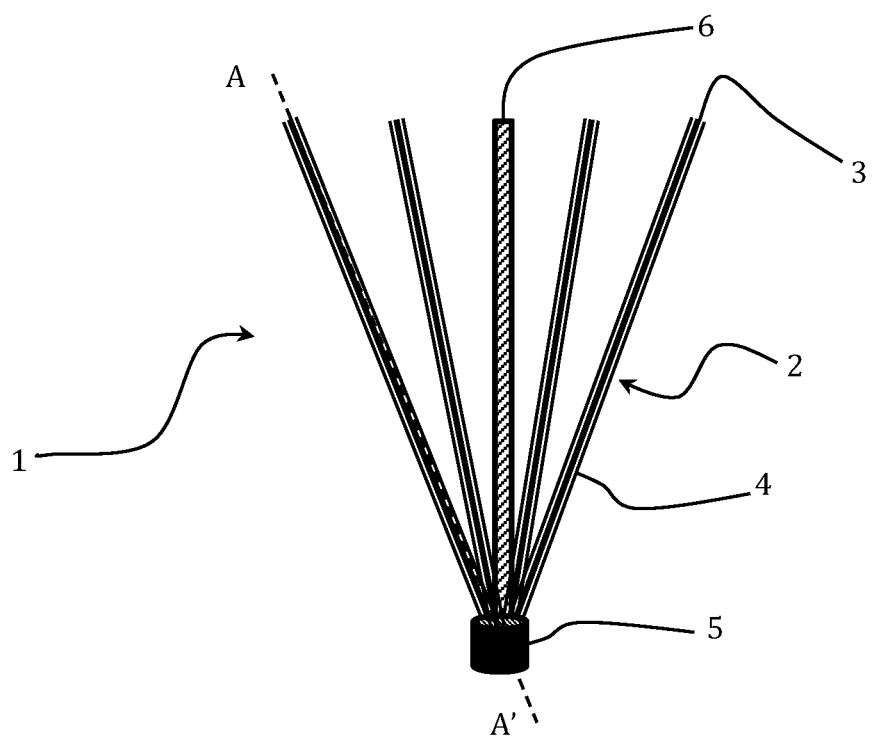
FIGS. 1 and 2 represent reinforcement structures for a crown and root tooth restoration according to two embodiments, in schematic manner, in cross-section.

As illustrated in FIG. 1, reinforcement structure 1 for a crown and root tooth restoration comprises a bundle of pins 2. What is meant by bundle of pins 2 is an assembly of slender members joined to one another. The different pins are substantially parallel to one another and are at least oriented in the same general direction.

The bundle comprises at least two pins 2. Preferentially, the bundle comprises from 2 to 10 pins, even more preferentially from 3 to 10 pins, and even more preferentially from 3 to 5 pins. The number of pins 2 is advantageously inversely proportional to the diameter of pins 2.

Pins 2 are advantageously of identical length. They thus form a bundle of homogeneous shape. In the alternative embodiment represented in FIG. 2, pins 2 can be of different lengths, their ends being staggered.

Pins 2 are advantageously flexible so as to be able to be easily inserted in the tooth canal and to adapt to the complex morphology of the tooth canals. What is meant by flexible is a flexible member that can curve easily.

In FIG. 1, pins 2 are straight—they are represented in schematic manner. In reality, as they are flexible, they can present a curved shape.

Pins 2 have a small diameter. What is meant by small diameter is a diameter smaller than or equal to 0.5 mm and advantageously comprised between 0.1 mm and 0.5 mm.

Pins 2 can thus easily adjust to a wide range of canal structures, even to very cramped structures.

According to one embodiment, pins 2 have an identical diameter, i.e. all the pins have roughly the same diameter to within 0.05 mm. According to another embodiment, pins 2 have an increasing cross-section from the centre of the bundle to the periphery of the bundle.

For example, the pins can have an increasing diameter as a centre of the reinforcement structure is approached. For example, the diameter can be equal to 0.5 mm close to the centre and the pins in peripheral position can have a diameter of 0.3 mm.

According to another example, the bundle can be formed by two pins with a diameter of 0.5 mm, two pins with a diameter of 0.3 mm and two pins with a diameter of 0.15 mm.

The diameter of the pin can also vary along the whole of its length and the pin can have a geometry that is cylindrical-conical, staggered cylindrical, double conical or with a variable taper over its whole length.

According to another embodiment, pins 2 can have a decreasing cross-section from the centre of the bundle to the periphery of the bundle.

Pins 2 are advantageously made from composite material: pins 2 are formed by at least one fibre 3 coated with a first polymer matrix 4.

Advantageously, first polymer matrix 4 should be chosen by the person skilled in the art in such a way as to achieve a solid association of the fibres with one another to form a strong fibre-reinforced composite pin. Preferentially, each pin 2 comprises several fibres 3 that are independent from one another or in the form of an assembly of fibres, the fibres being able for example to be twisted and possibly flocked, covered by a coating.

Fibres 3 are preferably unidirectional long fibres. Fibres 3 of one and the same pin 2 are coated in a polymer matrix 4. Each pin 2 is formed by fibres 3 coated in a polymer matrix 4.

Pins 2 are preferably, individually, totally polymerized so as to form flexible pins 2 independent from one another.

Fibres 3 act as reinforcement inside pins 2, along their large axis (axis AA' of FIG. 1).

Fibres 3 of pins 2 can be of identical or different nature, within any one pin 2. Fibres 3 can be of identical or different nature from one pin 2 to the other.

Any sort of fibre can be used provided it has a surface coating compatible with the assembly resin used. The fibres can be artificial manufactured fibres, such as siliceous fibres, carbon fibres, or organic fibres (made from poly(p-phenylene terephtalamide) (PPD-T), aramide, nylon etc.) or even natural fibres. Mineral fibres can also be used.

Figure 2:
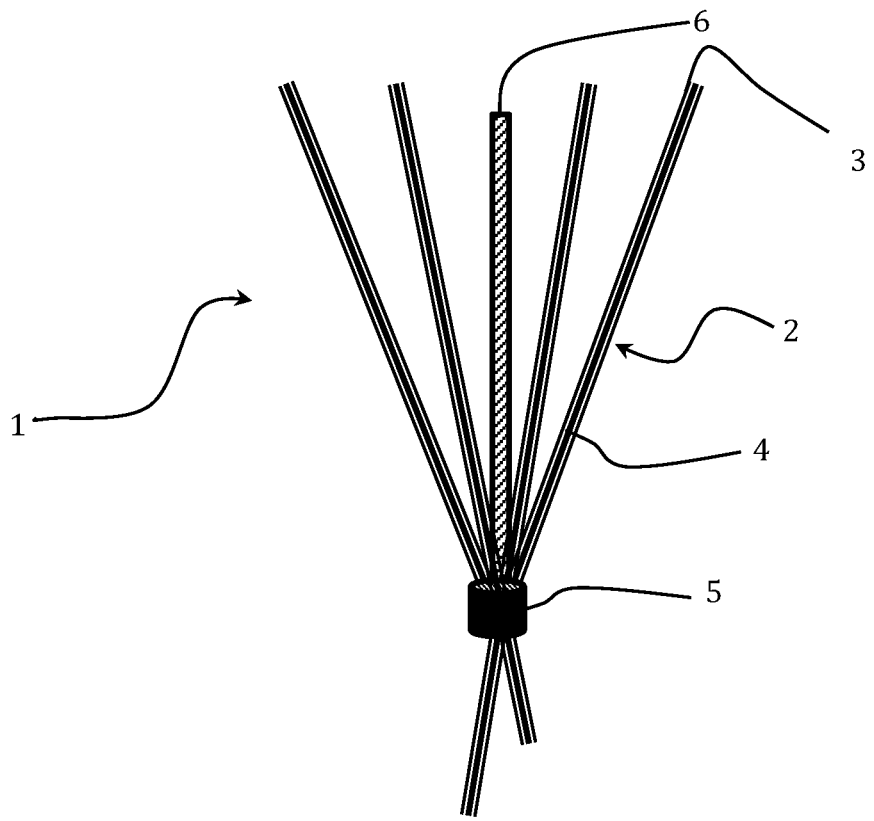

As represented in FIGS. 1 and 2, pins 2 are assembled, mechanically connected by an joining means 5. All the pins 2 are secured together by joining means 5. Joining means 5 is configured to group the plurality of pins 2 together.

Joining means 5 partially covers the length of pins 2 and is configured to mechanically secure the pins together and to leave a part of the length of pins 2 free.

In the illustrated embodiments, one end of pins 2 is free.

Joining means 5 is disposed in such a way that at least a half of the length of pins 2 is not secured by joining means 5. In advantageous manner, joining means 5 is disposed so that less than one third of the length of pins 2 is secured by joining means 5. In other words, joining means 5 covers less than half of the length of pins 2 and advantageously less than one third of the length of pins 2.

Joining means 5 is for example positioned in the first third of the length of the bundle of pins 2 so as to allow flexion of pins 2 with respect to joining means and possibly flexion of one pin 2 with respect to the other.

Preferentially, joining means 5 is disposed at one of the ends of the bundle of pins 2 so as to hamper the freedom of flexion of pins 2 is little as possible. What is meant by end is that joining means 5 is positioned on the first quarter of the length of pin 2.

Pins 2 are secured on one side only and can form a tapered bundle. What is meant by tapered bundle is a bundle of pins having the form of a bouquet, i.e. the cross-section of the bundle of pins 2 at the level of the joining means is strictly smaller than the cross-section of the bundle of pins at the level of the free end, i.e. the end opposite to joining means 5. Pins 2 can however be assembled in circular or oval manner, or with a flat cross-section, depending on the shape conferred by joining means 5.

Pins 2 can be secured at their ends but the ends may not coincide, for example in the case of pins 2 of different lengths.

Even more preferentially, joining means 5 is positioned right at the end of pins 2, the extreme edge of the pins, i.e. the pins are salient on one side of joining means 5 only.

Joining means 5 can be made from composite resin. The resin is chosen from methacrylate, polyether ether ketone (PEEK) and epoxide resins. It is also possible for joining means 5 to be formed by a heat-shrink sheath.

The resin can contain additives, in the form of mineral or organic colorants, as well as micrometric or nanometric particles designed to modify its consistency or its mechanical performances.

For example, pins 2 are secured by a sleeve made from polymerized composite resin. What is meant by sleeve is a cylindrical part open at least at one of its two ends.

Joining means 5 can be achieved by sticking the ends of the pins with a composite glue. This technique is preferentially chosen when the ends of the pins are staggered. The ends of the pins are staggered in joining means 5 when a thin, pointed apex is required for the bundle of pins.

Joining means 5 is configured to hold pins 2 together when the latter are handled. It is also configured in such a way that pins 2 can be removed one by one or in small quantities in the case where the structure accommodating the bundle of pins is of smaller dimension than the bundle of pins.

When one or more pins 2 are removed, joining means 5 continues to secure the remaining pins. The energy required to tear a pin 2 away from the bundle is lower than the energy required to open or break joining means 5. In this way, the size of the bundle of pins 2 is adaptable to suit requirements.

In a preferential embodiment of the invention, joining means 2 does not prevent pins 2 from sliding with respect to one another over at least one tenth of their length and it blocks them or retains them beyond this distance. For example, pins 2 can slide with respect to one another along their large axis (axis AA' of FIG. 1). Pins 2 can cross one another inside the reinforcement structure.

To facilitate access operations to the apical areas of the dental root, it is particularly advantageous to define a preferential etching canal 6 inside reinforcement structure 1.

This preferential etching canal 6 is configured to be eliminated more easily than reinforcement pins 2 of reinforcement structure 1. This preferential etching canal 6 is configured to define a canal that will be etched more easily than the rest of reinforcement structure 1, thereby enabling the risks of weakening or perforation of the canal walls to be reduced by imposing the direction of etching in the crown and root restoration.

In order to control the etching direction better, the inventors propose to form a preferential etching canal 6 that will be able to be etched more easily than the other materials of the restoration so as to be able to better impose the etching path.

Etching canal 6 is advantageously made from a material that presents lower abrasion performances than the abrasion performances of the materials forming reinforcement pins 2. In advantageous manner, the material forming etching canal 6 presents a lower hardness than the hardness of the material used to form pins 2. In a preferential embodiment, the hardness of the material forming the etching channel is less than or equal to 90% of the hardness of the material forming pins 2, even more preferentially less than or equal to 70% of the hardness of the material forming pins 2.

The hardness can be a Vickers hardness or a Shore hardness depending on the materials used. It is also possible to use Rockwell, Brinell or Meyer hardnesses.

It is also advantageous to provide for etching canal 6 to be made from a material that presents lower abrasion performances than the abrasion performances of the material forming polymer matrix 7 that fills tooth canal 8. In advantageous manner, the material forming etching canal 6 presents a lower hardness than the hardness of the material used to form polymer matrix 7. In a preferential embodiment, the hardness of the material forming the etching canal is less than or equal to 90% of the hardness of the material forming polymer matrix 7, even more preferentially less than or equal to 70% of the hardness of the material forming polymer matrix 7. In a preferential embodiment, the material forming etching canal 6 is different from a metal or from a metal alloy.

Reinforcement structure 1 comprises an additional pin that is different from reinforcement pins 2. The additional pin will define the preferential etching canal 6. Depending on the embodiments, the additional pin is fixed directly to reinforcement pins 2 and/or to joining means 5. In a particular embodiment, additional pin does not have any direct contact with joining means 5. In advantageous manner, the additional pin is in direct contact with at least one of the reinforcement pins.

Reinforcement structure 1 is used in the future crown and root restoration in order to form a preferential abrasion area that is surrounded by reinforcement pins 2 that form reduced abrasion areas. Reinforcement pins 2 will force the drill bit into a predefined space so that it preferentially etches etching canal 6. It is advantageous to provide for the additional pin to present a length equal to at least 90% of the smallest reinforcement pin 2 of reinforcement structure 1.

Figure 3:
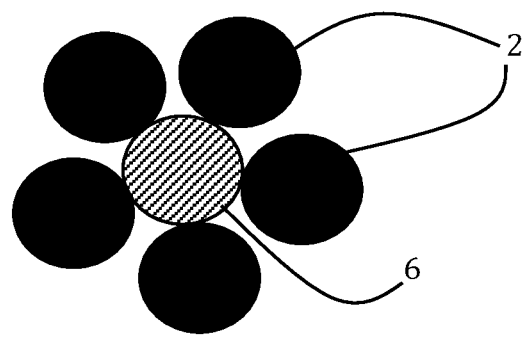
FIGS. 3, 4, 5 and 6 represent different configurations of a reinforcement structure, in schematic manner, in cross-section.
Figure 4:
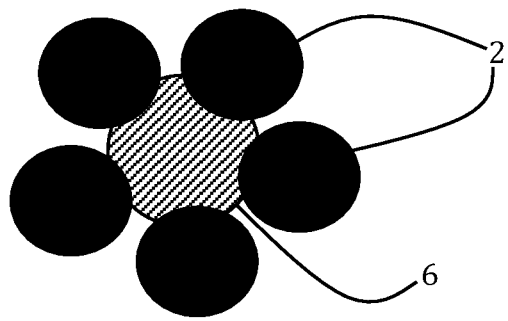
Figure 5:
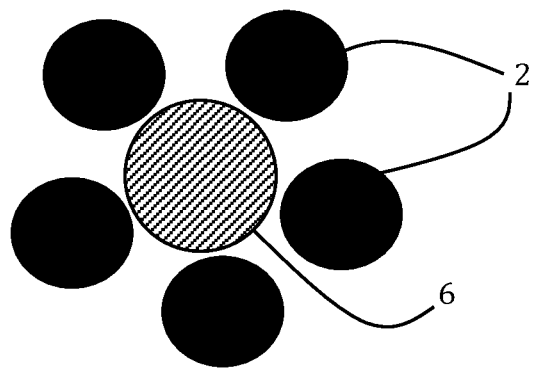

In a first embodiment illustrated in FIGS. 3, 4, 5 and 6, etching canal 6 is surrounded by reinforcement pins 2. Depending on the cases involved, etching channel 6 is completely or partially surrounded by reinforcement pins 2. By completely surrounding etching channel 6 by reinforcement pins 2, the risks of etching in an undesired direction are low or even inexistent. However, in such an embodiment, reinforcement structure 1 bulkiness may be of large size. It is therefore advantageous to partially surround etching channel 6 advantageously using less than five reinforcement pins as represented in FIGS. 3, 4 and 5. A particularly advantageous configuration uses three reinforcement pins 2 that are placed at the periphery of etching channel 6 and preferentially in such a way as to define an equilateral or at least isosceles triangle. This configuration is particularly efficient and presents small overall dimensions.

Configurations with two reinforcement pins are also possible, but this requires a greater practical experience of this type of reinforcement structure 1 blocking the drill bit against the two reinforcement pins 2. In the latter case, it is advantageous not to place the two reinforcement pins in diametrically opposite manner with respect to etching canal 6.

In order to efficiently impose the direction of depression of the drill bit when the etching operation is performed, it is particularly advantageous to place reinforcement pins 2 in contact with etching canal 6. In this way, when reinforcement structure 1 is inserted, reinforcement pins 2 remain close to etching canal 6.

In even more advantageous manner, reinforcement pins 2 are in contact with etching canal 6 and are mechanically secured to etching canal 6. In this way, when reinforcement structure 1 is inserted, the reinforcement pins remain in contact with the etching canal. If etching canal 6 is deformed during the crown and root restoration operation, the same is the case for reinforcement pins 2. In such an embodiment, it is particularly advantageous to limit the space occupied by reinforcement structure 1 by reducing the number of pins 2. As an alternative, it is possible to provide for certain reinforcement pins 2 to be fixed directly to etching canal 6 and for other pins 2 not to be fixed directly to etching channel 6 while at the same time being secured by means of joining means 5. The pins that are not fixed to etching canal 6 can fill the tooth canal in order to strengthen the future crown and root restoration.

In a preferential embodiment, the additional pin forming etching canal 6 is fixed to pins 2 over a distance representing at least 70% of its length. Preferably, etching canal 6 is mechanically connected with at least one of reinforcement pins 2 over the whole of its length. Depending on the embodiments, etching canal 6 is fixed continuously to at least one of reinforcement pins 2. As an alternative, etching canal 6 is fixed at certain points to at least one of reinforcement pins 2 by means of several fixing points distinct from one another (embodiment not represented). It is possible to combine these embodiments according to reinforcement pins 2 in one and the same reinforcement structure 1. By increasing the fixing distance between reinforcement pins 2 and etching canal 6, reinforcement pins 2 coerce the drill bit over a greater depth. In a particular embodiment, fixing is obtained by sticking. In advantageous manner, the additional pin is fixed to at least one of the reinforcement pins over the whole of the facing length.

In this configuration, the shape taken by future etching canal 6 inside the tooth canal is also taken by the plurality of reinforcement pins 2 which will impose the direction of the drill bit when the future etching step is performed. It is particularly advantageous to provide for future etching canal 6 to be fixed to the plurality of reinforcement pins 2. In this way, several reinforcement pins 2 are secured to one another and deform in the same way.

When preferential etching canal 6 is eliminated, reinforcement pins 2 surrounding etching canal 6 will coerce the drill bit to force it to follow the direction of canal 6. The risks of perforation of the canal walls due to a drill bit that was depressed in a wrong direction are greatly reduced.

It is advantageous to provide for reinforcement pins 2 to present a length at least equal to that of etching canal 6 starting from the location of joining means 5.

It is possible to provide for each pin 2 to present a free end that is movable in flexion with respect to the other pins 2 of the bundle of pins. The pins are preferentially salient from etching canal 6 in the direction of the longitudinal axis in the areas that are free from flexion.

In a particular embodiment, reinforcement structure 1 comprises at least one pin presenting a free end that is movable in flexion and in translation with respect to the other pins 2 of the bundle of pins and for example with respect to pins 2 fixed to etching canal 6. Pins 2 can also slide freely with respect to one another along their large axis while being curbed by their reciprocal friction.

It is also possible to provide for etching canal 6 to also present one end that is free in flexion with respect to pins 2. In this configuration, the part in contact between pins 2 and preferential etching canal 6 will define the main direction of the drill bit when etching is performed.

FIGS. 3 and 4 represent cross-sectional views along a plane perpendicular to the longitudinal axis of pins 2. Preferential etching area 6 is surrounded by a group of at least two or three reinforcement pins. Reinforcement pins 2 will form a guide for the drill bit by forcing it to drill the material that is easiest to etch.

In the embodiment of FIG. 3, etching canal 6 is in contact with reinforcement pins 2 at certain points only. In the embodiment of FIG. 4, etching canal 6 covers a larger surface of reinforcement pins 2 so as to enhance the strength between canal 6 and associated pin 2.

In a particular embodiment, the additional pin forming etching canal 6 covers at least one third of the circumference of at least one of reinforcement pins 2 in a section plane perpendicular to the longitudinal axis of reinforcement pin 2, preferably of all the pins 2 in contact. In preferential manner, the additional pin covers at least two thirds of the circumference of reinforcement pin 2 in the section plane perpendicular to the longitudinal axis of reinforcement pin 2. In an embodiment that is not illustrated, the material forming the etching canal completely surrounds at least one reinforcement pin 2 in a section plane perpendicular to the longitudinal axis of reinforcement pin 2.

In a second embodiment illustrated in FIG. 5, etching canal 6 is separated from the reinforcement pins so as to be in direct contact with polymer matrix 7 filling tooth canal 8. In a particular embodiment, polymer matrix 7 completely surrounds etching canal 6 and is in contact over the whole of its circumference.

Etching canal 6 is advantageously made from a material that presents lower abrasion performances than the abrasion performances of the materials forming polymer matrix 7. In this way, when the preferential etching area is eliminated, polymer matrix 7 surrounding etching canal 6 will force the drill bit to follow the direction of etching canal 6. The risks of perforation of the canal walls due to a drill bit extending transversely in the reinforcement are very greatly reduced. In this case, polymer matrix 7 coerces the drill bit so that it etches etching canal 6.

Figure 6:
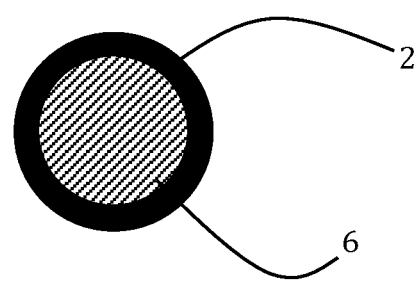

In a third embodiment illustrated in FIG. 6, etching canal 6 is formed by an additional pin that comprises a core surrounded by a sheath. The core will form etching canal 6 whereas the sheath will form hollow reinforcement pin 2. The core is advantageously made from a material that presents lower abrasion performances than the abrasion performances of the materials forming the sheath. In this way, when the core is eliminated, the sheath surrounding etching canal 6 will force the drill bit to follow the direction of canal 6. The risks of perforation of the canal walls are thereby very greatly reduced.

It is naturally possible to combine these different embodiments with one another.

The inventors observed that the embodiments illustrated in FIGS. 3, 4 and 6 are particularly advantageous as they enable etching canals 6 to be formed from materials that are easy to etch and/or of small diameter. The maximum diameter of etching canal 6 is advantageously smaller than 1.2 mm. In these configurations, the materials forming etching canal 6 are effectively protected by reinforcement pins 2.

The inventors observed that when etching canal 6 is used on its own, i.e. outside reinforcement structure 1 with surrounding reinforcement pins 2, the constraints on its use in relation with etching canal 6 are high. If the etching channel is too rigid, it is liable to break when it is inserted in tooth canal 8 as it will not be able to easily deform to follow the shape of tooth canal 8. If on the other hand the material is too flexible or too fluid, etching canal 6 will not be able to support its weight. Insertion will then be very difficult and etching canal 6 will deform without following the shape of tooth canal 8. It is also apparent that these execution constraints will encourage implementation of etching channels 6 having large diameters which is not always usable.

On the contrary, in proposed reinforcement structure 1, if the material of the additional pin is too rigid, it may crack but will remain attached to reinforcement pins 2 which will define the shape of etching canal 6. If on the other hand, the material is too flexible, it will not hold on its own but is supported by reinforcement pins 2.

The above-mentioned configurations are therefore particularly advantageous as they allow a greater choice in the materials able to be used to form etching canal 6 and in the dimensions able to be used.

The etching canal can for example be formed from a thermoplastic material and preferentially from thermoplastic elastomer. It is particularly advantageous to provide for formation of an etching canal 6 made from polyisoprene and advantageously from synthetic polyisoprene. It is also possible to make etching canal 6 from cis-1,4-polyisoprene or from trans-1,4-polyisoprene and advantageously from a trans-1,4-polyisoprene having a molecular weight comprised between 16,000 and 18,000 g/mol. It is particularly advantageous to make etching canal 6 from gutta-percha (in its alpha, beta and gamma forms) or from gutta-balata. In a particular embodiment, etching canal 6 is devoid of polymerizable resin. It is particularly advantageous to provide for etching canal 6 to be exclusively made from thermoplastic material or from resin-impregnated textile material.

The use of gutta-percha is particularly advantageous as it can be charged with radio-opaque elements which enable etching canal 6 to be easily observed after the crown and root restoration, before the etching step or during etching in order to determine the distance separating the hole formed and the tooth wall.

In a particularly advantageous embodiment, the material forming etching canal 6 comprises 20% by weight of gutta-percha, between 35% and 75% by weight of zinc oxide, and between 2% and 30% by weight of barium sulphate enabling the mixture to be made radio-opaque. It is also possible to add between 1 and 4% by weight of a plasticizer, for example a wax and/or a resin, in order to obtain the required viscosity.

It is further possible to add a colourant, for example erythrosine, in order to colour the mixture. Anti-microbial elements can be added, for example calcium hydroxide, chlorhexidine, or iodoform.

In a particularly advantageous embodiment, the material forming etching canal 6 has a melting temperature of less than 120° C.

It is advantageous to fill tooth canal 8 with a polymer material 7 that is an organic matrix and more particularly with a material chosen from acrylate resins, methacrylate resins, polymethacrylate resins, dimethacrylate urethane resins, or bis phenol-a-glycidil dimethacrylate-epoxy resins.

In this way, it is then possible to etch preferential etching canal 6 inside reinforcement structure 1 of the crown and root tooth restoration, preferential etching canal 6 enabling the direction of depression of the drill bit in the restoration tooth to be imposed.

Although etching canal 6 is demarcated by a plurality of reinforcement pins 2, it is possible to provide for the material forming etching canal 6 to overspill beyond one or more of pins 2. It is possible to form a reinforcement structure 1 in which several reinforcement pins 2 are placed in a volume of etching material, pins 2 limiting the canal and ensuring correct placing of the drill bit. It is possible to provide for one or more of the pins to be completely surrounded by the material forming the etching canal in a section plane perpendicular to the longitudinal axis of reinforcement pins 2.

It is possible to provide for reinforcement structure 1 to have one or more reinforcement pins 2 that are not connected directly to etching canal 6. Each of pins 2 advantageously presents a mobility in the three dimensions in space in order to enhance filling of the volume of tooth canal 8.

Advantageously, joining means 5 does not prevent pins 2 that are not secured to etching canal 6, also called microposts, from moving with respect to one another in all three dimensions.

As represented in FIGS. 7 to 10, the method for performing a crown and root tooth restoration 9, on a laboratory model, for example a mould, comprises the following successive steps:
- at least partially filling a tooth canal 8 of the laboratory model with a first composite resin 7 (FIG. 8),
- providing the above-mentioned reinforcement structure 1 with its etching canal 6, and advantageously impregnated with a second composite resin 10 (FIG. 9),
- inserting reinforcement structure 1 in tooth canal 8,
- polymerizing first composite resin 7 so as to obtain a crown and root restoration 9.

As a less advantageous alternative, reinforcement structure 1 is fitted in tooth canal 8 before tooth canal is filled with resin 7.

Polymerization of resin 7 is performed whereas the reinforcement structure is located in the tooth canal in order to fix its position.

It is particularly advantageous to provide for tooth canal 8 to also be filled by other reinforcement structures 11 that have an etching canal 6 or, preferentially, that do not have such a canal. In a preferential embodiment, the crown and root restoration comprises a single reinforcement structure 1 that is provided with an etching canal 6.

The rest of tooth canal 8 can be filled by reinforcement structures 11 comprising several pins 2 mechanically associated to one another by an joining means 5. It is also possible to fill tooth canal 8 with individual pins 2 before the polymerization step.

To facilitate access to the bottom of the restoration it is particularly advantageous to place reinforcement structure 1 provided with an etching canal 6 in the centre or substantially in the centre of tooth canal 8 in a section plane that is perpendicular to the longitudinal axis of tooth canal 8. The inventors observed that the strongest mechanical stresses are situated on the edge of the restoration. By placing etching canal 6 in the centre of the restoration, access is secured without modifying the general strength of the restoration. The other reinforcement structures 1 and 11 that are placed in the restoration and at the periphery ensure a good strength being placed at the periphery.

Figure 7:
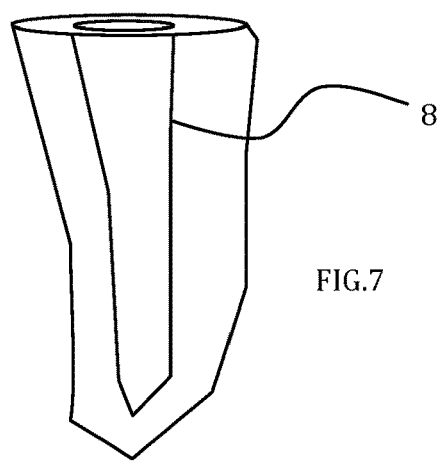
FIGS. 7, 8, 9 and 10 represent steps of a method for performing a crown and root tooth restoration, according to one embodiment, in schematic manner, in cross-section.

FIG. 7 represents a root canal 8, in this case in the form of a cavity. The method can be performed on any laboratory model presenting a cavity.

Figure 8:
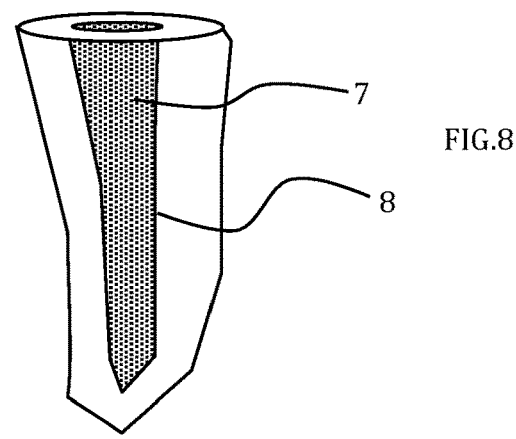

During step 1), root canal 8, or cavity, is filled with a first composite resin 7 (FIG. 8). Preferentially it is completely filled with resin.

Reinforcement structure 1 is advantageously impregnated with second composite resin 10 (step 2). Reinforcement structure 1 is preferentially impregnated up to saturation, i.e. at least pins 2 of reinforcement structure 1 are completely covered by second composite resin 10. As a variant, reinforcement structure 1 is provided without the second composite resin, and second resin 10 is deposited at a later stage.

Preferentially, first composite resin 7 and second composite resin 10 are of the same nature, i.e. they present the same chemical functions. Even more preferentially, first composite resin 9 and second composite resin 10 are one and the same bonding resin, i.e. they are identical. This makes for a better mechanical strength. The resins are polymerizable.

Advantageously, the same composite glue is used for making the crown part and the crown and root part.

According to another embodiment, composite matrix 4 independently encapsulating each pin 2 can be different from first composite resin 9.

Figure 9:
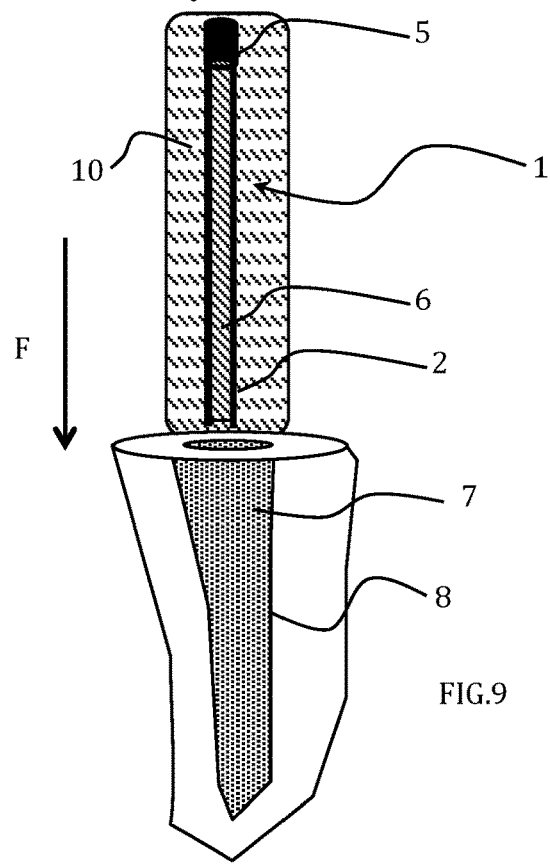

During step 3, reinforcement structure 1 is inserted in tooth canal 8 (arrow F of FIG. 9). This reinforcement structure 1 comprises an etching canal 6 and is preferentially placed in the centre of tooth canal 8.

Figure 10:
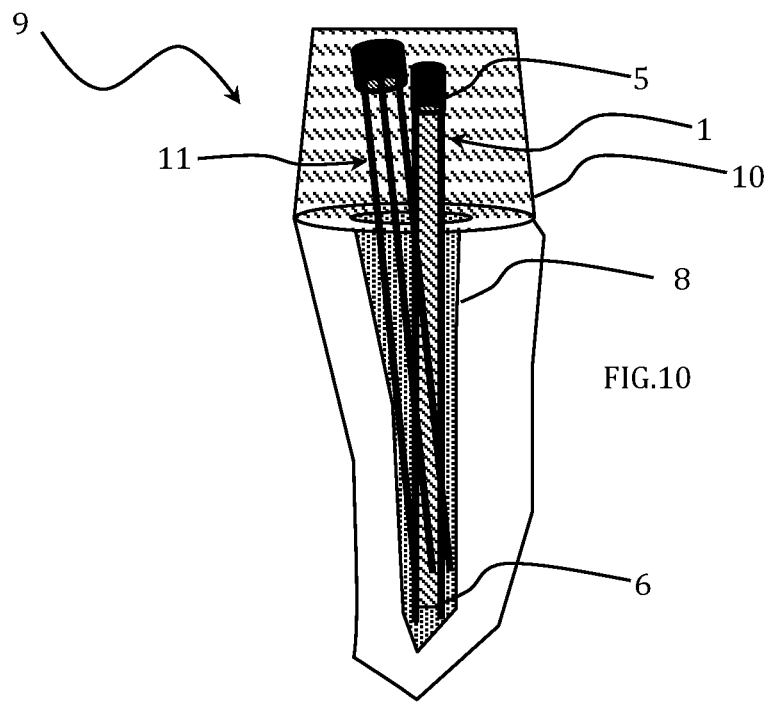

Depending on the embodiments, joining means 5 protrudes out from tooth canal (FIG. 10). The latter embodiment is advantageous as it is possible to eliminate joining means 5 once pins 2 and the additional pin have been securely fitted in tooth canal 8.

Joining means 5 and bundle of pins 2 coated with resin 10, in close contact with the walls of the tooth canal, form a mechanically compact and coherent assembly, thereby achieving a seamless continuity of volume participating in distribution of the stresses without load interruption and without presenting stress concentration areas liable to cause breakage.

Pins 2 of reinforcement structure 1 or of the different reinforcement structures are dispersed continuously throughout the whole of first composite resin 7 of the restoration. Reinforcement structure 1 adjusts to match the geometry of the cavity by sliding of pins 2 with respect to one another During step 4, first composite resin 7 and second composite resin 10 are polymerized. After polymerization, the location of pins 2 in crown and root restoration 9 is fixed. It is advantageous to provide for first composite resin 7 and/or second composite resin 10 to be resins able to be activated by a chemical initiator and/or by an electromagnetic radiation which is preferably a visible radiation.

Polymerization enables a crown and root tooth restoration 9 to be constituted with a rigidity intrinsically ensured by its shape and the architecture of its reinforcements.

The crown part is advantageously formed by the same pins 2 as the root part.

Crown and root tooth restoration 9 obtained in accordance with the method can be performed without performing rectification of tooth canal 8 in its crown and root part, up to ⅔ of the crown part. The canal can be instrumented with reamers of variable taper to perform the endodontic treatment. At the apex, the taper angle is therefore defined by this instrumentation.

Furthermore, it has the same geometry as the apex of the drill bit used in preparation of tooth canal 8 for the endodontic treatment and can easily adjust to the anatomical particularities of the pulp chambers and tooth canals.

Reinforcement structure 1 and resins 7 and/or 10 form a self-supporting structure ensuring the intrinsic strength of the restoration.

As indicated in the above, the tooth restoration can also comprise reinforcement structures 1, 11 inserted side by side in one and the same tooth canal 8 (FIG. 10). The two reinforcement structures 1, 11 are inserted in the same tooth canal 8 to form a single crown and root tooth restoration. Joining means 5 of each reinforcement structure 1, 11 are disposed side by side in the canal and pins 2 of the two reinforcement structures can be intertwined.

The number of pins and/or the diameter of the pins are adjusted according to the shape and size of the cavity designed to receive reinforcement structures 1 and 11.

When reinforcement structure 11 is not provided with an etching canal 6, pins 2 of each reinforcement structure 11 are advantageously independent from one another and adjust by flexion to the natural morphology of a tooth canal 8 without reaming into a specific shape.

According to a preferential embodiment, joining means 5 is a heat-shrink sleeve. What is meant by heat-shrink is a part having the property of retracting due to the action of heat. What is meant by sleeve is a casing, a sheath that is able to adjust to the shape and size of the bundle of pins.

Figure 11:
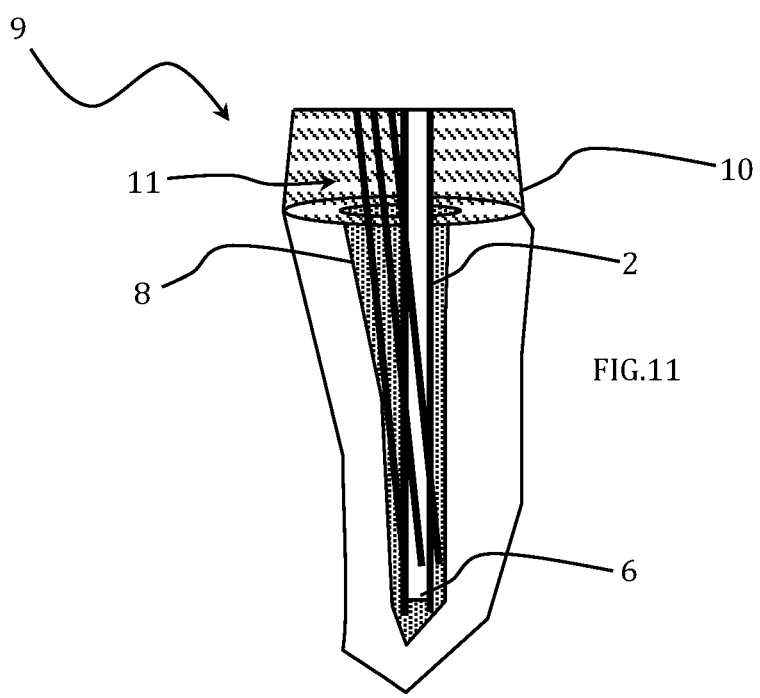
FIG. 11 represents opening of a crown and root tooth restoration, in schematic manner, in cross-section.

Preferentially, and as represented in FIGS. 10 and 11, in step 3) of the method for performing the crown and root tooth restoration described above, reinforcement structures 1, 11, provided with a heat-shrink sleeve, are inserted in the canal: pins 2 are located at the level of the root part of the canal and joining means 5 is positioned above the crown part. Joining means 5 is in distal position with respect to the apical part of the tooth canal.

Joining means 5 is advantageously used as gripping means.

Before the polymerization step (step 4 of the method described above), a second reinforcement structure 11 can be placed alongside first reinforcement structure 1, in tooth canal 8 (FIG. 10).

In this configuration (joining means disposed opposite the apical part of the tooth canal), joining means 5 can be eliminated on completion of the crown and root tooth restoration operation.

According to either alternative embodiments, this positioning of reinforcement structures 1 and 11 can also be performed with a bundle of pins 2 provided with joining means 5 of another kind. The latter can be formed by a simple sheath or by any part enabling pins 2 to be held together in the form of a bundle. Joining means 5 can confer any shape on the bundle of pins, flattened in a single plane, ovoid, circular, or triangular. There is no limit to the possible shapes.

The number of reinforcement structures 1 inserted in tooth canal 8 depends on the size of said canal. FIG. 10 represents for example a canal in which two reinforcement structures are inserted side by side.

From one to ten reinforcement structures 1 can thus be inserted in the tooth canal.

Crown and root restoration 9 can be performed for example on laboratory dental models.

Crown and root tooth restoration 9 fits snugly with and respects the anatomical and physiological particularities of root canal 8.

Reinforcement structure or structures 1 extend throughout the whole volume of the root part and of the supra-gingival crown part of crown and root tooth restoration 9. They enable the whole of the material of the restoration constituting the crown part but also the root part to be reinforced in continuity.

After crown and root restoration 9 has been performed, if it is necessary to access an infected apex, the top part of restoration 9 is eliminated so as to access etching canal 6 and reinforcement pins 2. Etching canal 6 is advantageously etched by means of a drill bit. Pins 2 and/or composite resin 7, 10 act as guide to impose depression of the drill bit in the direction defined by etching canal 6. Composite resin 7, 10 and/or reinforcement pins 2 will form a guide for the drill bit so that the latter follows the shape of the etching canal as illustrated in FIG. 11.

Etching is easier than in embodiments of the prior art where a more homogenous material is formed to achieve the crown and root restoration or where the configuration of an etching canal is not mastered.

In advantageous manner, the material forming the matrix is etched more quickly than the material forming reinforcement pins 2. It is therefore advantageous to choose the material used to form the etching canal according to the material used to impose the position of the drill bit.

The invention claimed is:

1. Reinforcement structure for a crown and root tooth restoration comprising:
a plurality of reinforcement pins,
an additional pin made from a material etched more quickly than the plurality of reinforcement pins so as to form an etching canal,
a joining element configured to group the plurality of reinforcement pins and the additional pin together so as to form a bundle of pins, said joining element partially covering a length of the reinforcement pins, the additional pin being fixed directly or indirectly to the joining element between the reinforcement pins, wherein the joining element is configured to hold the reinforcement pins together when handled in such a way that it is possible to remove reinforcement pins one by one or in small quantities, the additional pin being fixed to an adjacent reinforcement pin of the plurality of reinforcement pins over at least 70% of a length of the additional pin or locally by means of a plurality of attachment points distinct from one another.

2. Reinforcement structure according to claim 1, wherein the additional pin covers at least one third of a circumference of the at least one adjacent reinforcement pin in a section plane perpendicular to a longitudinal axis of the at least one adjacent reinforcement pin.

3. Reinforcement structure according to claim 1, wherein the additional pin is made from polyisoprene.

4. Reinforcement structure according to claim 1, wherein the joining means element is disposed at one of the ends of the bundle of pins.

5. Reinforcement structure according to claim 1, wherein the plurality of reinforcement pins comprises different reinforcement pins arranged so as to present an increasing diameter from the centre of the bundle of pins to the periphery of the bundle of pins.

6. Reinforcement structure according to claim 1, wherein the plurality of reinforcement pins have a decreasing diameter from the centre of the bundle of pins to the periphery of the bundle of pins.

7. Reinforcement structure according to claim 1, wherein the bundle of pins comprises from 3 to 10 reinforcement pins.

* * * * *